(12) United States Patent
Huang et al.

(10) Patent No.: US 11,740,886 B2
(45) Date of Patent: Aug. 29, 2023

(54) ALGORITHM UPDATE METHOD AND APPARATUS

(71) Applicant: HUAWEI TECHNOLOGIES CO., LTD., Shenzhen (CN)

(72) Inventors: Jianwen Huang, Shenzhen (CN); Xiaoqiang Jia, Beijing (CN); Hongbo Tian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 17/213,834

(22) Filed: Mar. 26, 2021

(65) Prior Publication Data

US 2021/0216301 A1 Jul. 15, 2021

Related U.S. Application Data

(63) Continuation of application No. PCT/CN2019/090151, filed on Jun. 5, 2019.

(30) Foreign Application Priority Data

Sep. 27, 2018 (CN) .......................... 201811130135.4

(51) Int. Cl.
  *G06F 8/65* (2018.01)
  *H04N 23/617* (2023.01)

(52) U.S. Cl.
  CPC .............. *G06F 8/65* (2013.01); *H04N 23/617* (2023.01)

(58) Field of Classification Search
  CPC ......... H04M 1/72561; H04M 1/72572; H04W 4/003; G06F 17/3053; G06F 8/65; H04I 67/025
  See application file for complete search history.

(56) References Cited

U.S. PATENT DOCUMENTS

2007/0074201 A1   3/2007   Lee
2011/0090344 A1   4/2011   Gefen et al.
(Continued)

FOREIGN PATENT DOCUMENTS

CN   104702982 A   6/2015
CN   105975295 A   9/2016
(Continued)

OTHER PUBLICATIONS

Luksa Marko: "Kubernetes in action", Dec. 1, 2017 (Dec. 1, 2017), pp. 1-400, XP093011357,ISBN 978-1-61729-372-6, 400 total pages.

(Continued)

*Primary Examiner* — Xi Wang
(74) *Attorney, Agent, or Firm* — Rimon PC

(57) ABSTRACT

An algorithm update method and an apparatus is disclosed, the method includes: receiving, by an internet protocol camera, a deletion instruction that includes a to-be-deleted algorithm container identifier and that is sent by a monitoring system; deleting, by the internet protocol camera, a to-be-deleted algorithm container instance corresponding to the to-be-deleted algorithm container identifier; receiving, by the internet protocol camera, a deployment instruction that includes a to-be-deployed algorithm description file and that is sent by the monitoring system; parsing, by the internet protocol camera, the to-be-deployed algorithm description file to obtain at least one file identifier; obtaining, by the internet protocol camera, at least one to-be-deployed algorithm image file corresponding to the at least one file identifier; and generating, by the internet protocol camera, a to-be-deployed algorithm container instance based on the at least one to-be-deployed algorithm image file.

18 Claims, 8 Drawing Sheets

(56) References Cited

U.S. PATENT DOCUMENTS

2015/0378331 A1* 12/2015 Hayashi ............ H04L 12/6418
                                                          700/19
2017/0242678 A1   8/2017  Sangameswaran et al.
2018/0143820 A1   5/2018  Banford et al.

FOREIGN PATENT DOCUMENTS

| CN | 106210132 A | 12/2016 |
| CN | 106454276 A | 2/2017  |
| CN | 107171888 A | 9/2017  |
| CN | 107580322 A | 1/2018  |
| CN | 107819632 A | 3/2018  |
| CN | 107943501 A | 4/2018  |
| CN | 108551395 A | 9/2018  |

OTHER PUBLICATIONS

Rodriguez-Ricardo Angel: "GitHub—QuantumObject/docker-zoneminder at 76f800915fa39aa762e6da8b3384d636b5bca192",GitHub,Sep. 15, 2018,XP055841733,total 7 pages.
Kniep Christian: "DevOps Workflow From 0 to kube in 60 min Motivation",Feb. 20, 2018,XP055841726,total 19 pages.
Zheng Zhongye et al.,"An expandable digital network video monitoring system with priority",Security Technology,2007, with an English machine translation of abstract,total 5 pages.

* cited by examiner

ALGORITHM UPDATE METHOD AND APPARATUS

CROSS-REFERENCE TO RELATED APPLICATIONS

This application is a continuation of International Application No. PCT/CN2019/090151, filed on Jun. 5, 2019, which claims priority to Chinese Patent Application No. 201811130135.4, filed on Sep. 27, 2018. The disclosures of the aforementioned applications are hereby incorporated by reference in their entireties.

TECHNICAL FIELD

Embodiments of this application relate to the field of communications technologies, and more specifically, to an algorithm update method and an apparatus.

BACKGROUND

In the video surveillance field, a monitoring system may manage a plurality of internet protocol cameras, monitoring software is configured for each internet protocol camera, and an image recognition algorithm is preset in the monitoring software of each internet protocol camera.

When the algorithm in the monitoring software needs to be updated, the algorithm cannot be updated independently because the algorithm has been integrated into the monitoring software of the internet protocol camera. The algorithm can be updated only by reinstalling monitoring software with a latest version on the internet protocol camera.

In the foregoing related technologies, updating the algorithm requires reinstalling the monitoring software on the internet protocol camera, and reinstalling the monitoring software interrupts all functions of the internet protocol camera. Consequently, the internet protocol camera cannot run normally.

SUMMARY

Embodiments of this application provide an algorithm update method and an apparatus, to update an algorithm without affecting normal running of an internet protocol camera.

The embodiments of this application are implemented as follows:

According to a first aspect, an embodiment of this application provides an algorithm update method. The method includes: receiving, by an internet protocol camera, a deletion instruction that includes a to-be-deleted algorithm container identifier and that is sent by a monitoring system, where the to-be-deleted algorithm container identifier in the deletion instruction is an identifier of a to-be-deleted algorithm container instance in the internet protocol camera, and a to-be-deleted algorithm runs in the to-be-deleted algorithm container instance; deleting, by the internet protocol camera, the to-be-deleted algorithm container instance corresponding to the to-be-deleted algorithm container identifier; receiving, by the internet protocol camera, a deployment instruction that includes a to-be-deployed algorithm description file and that is sent by the monitoring system; parsing, by the internet protocol camera, the to-be-deployed algorithm description file to obtain an identifier of at least one to-be-deployed algorithm image file, where a to-be-deployed algorithm is encapsulated in the at least one to-be-deployed algorithm image file; obtaining, by the internet protocol camera, the at least one to-be-deployed algorithm image file based on the identifier of the to-be-deployed algorithm image file; and generating, by the internet protocol camera, a to-be-deployed algorithm container instance based on the at least one to-be-deployed algorithm image file, where the to-be-deployed algorithm runs in the to-be-deployed algorithm container instance.

In the first aspect, normal running of the internet protocol camera is not affected in a process in which the internet protocol camera deletes the to-be-deleted algorithm container instance in which the to-be-deleted algorithm runs, and in a process in which the internet protocol camera deploys the to-be-deployed algorithm container instance in which the to-be-deployed recognition algorithm runs. Therefore, the algorithm update method provided in this embodiment of this application can improve stability of the internet protocol camera in a process of updating an algorithm.

In a possible implementation of the first aspect, the obtaining, by the internet protocol camera, the at least one to-be-deployed algorithm image file based on the identifier of the to-be-deployed algorithm image file includes: determining, by the internet protocol camera based on the identifier of the to-be-deployed algorithm image file, a first to-be-deployed algorithm image file that is not stored in the internet protocol camera and a second to-be-deployed algorithm image file that is stored in the internet protocol camera; sending, by the internet protocol camera, a request for obtaining the first to-be-deployed algorithm image file to the monitoring system; receiving, by the internet protocol camera, the first to-be-deployed algorithm image file sent by the monitoring system; and constituting, by the internet protocol camera, the at least one to-be-deployed algorithm image file by using the first to-be-deployed algorithm image file and the second to-be-deployed algorithm image file.

If some to-be-deployed algorithm image files of the at least one to-be-deployed algorithm image file are stored in the internet protocol camera, and the other to-be-deployed algorithm image files are not stored in the internet protocol camera, the internet protocol camera needs to obtain, from the monitoring system, the to-be-deployed algorithm image file that is not stored in the internet protocol camera. There is no need to obtain all of the to-be-deployed algorithm image files from the monitoring system. This can save a network transmission resource.

In a possible implementation of the first aspect, the obtaining, by the internet protocol camera, the at least one to-be-deployed algorithm image file based on the identifier of the to-be-deployed algorithm image file includes: determining, by the internet protocol camera based on the identifier of the to-be-deployed algorithm image file, the at least one to-be-deployed algorithm image file that is not stored in the internet protocol camera; sending, by the internet protocol camera to the monitoring system, a request for obtaining the at least one to-be-deployed algorithm image file; and receiving, by the internet protocol camera, the at least one to-be-deployed algorithm image file sent by the monitoring system.

In a possible implementation of the first aspect, the obtaining, by the internet protocol camera, the at least one to-be-deployed algorithm image file based on the identifier of the to-be-deployed algorithm image file includes: determining, by the internet protocol camera based on the identifier of the to-be-deployed algorithm image file, the at least one to-be-deployed algorithm image file that is stored in the internet protocol camera; and obtaining, by the internet protocol camera, the at least one to-be-deployed algorithm image file.

In a possible implementation of the first aspect, the generating, by the internet protocol camera, a to-be-deployed algorithm container instance based on the at least one to-be-deployed algorithm image file includes: generating, by the internet protocol camera, a to-be-deployed algorithm container image based on a container engine and the to-be-deployed algorithm description file, where the container engine is preset in the internet protocol camera; and creating, by the internet protocol camera, the to-be-deployed algorithm container instance based on the to-be-deployed algorithm container image and the at least one to-be-deployed algorithm image file.

In a possible implementation of the first aspect, after the deleting, by the internet protocol camera, the to-be-deleted algorithm container instance corresponding to the to-be-deleted algorithm container identifier, the method further includes: determining, by the internet protocol camera, a to-be-deleted algorithm container image and at least one to-be-deleted algorithm image file that correspond to the to-be-deleted algorithm container identifier, where the to-be-deleted algorithm is encapsulated in the at least one to-be-deleted algorithm image file; and deleting, by the internet protocol camera, the to-be-deleted algorithm container image and the at least one to-be-deleted algorithm image file.

After the internet protocol camera deletes a container instance, the internet protocol camera further needs to delete a container image and at least one algorithm image file stored in a memory of the internet protocol camera, so that a storage resource of the internet protocol camera can be saved.

According to a second aspect, an embodiment of this application provides an internet protocol camera. The internet protocol camera includes: a receiving module, configured to receive a deletion instruction that includes a to-be-deleted algorithm container identifier and that is sent by a monitoring system, where the to-be-deleted algorithm container identifier in the deletion instruction is an identifier of a to-be-deleted algorithm container instance in the internet protocol camera, and a to-be-deleted algorithm runs in the to-be-deleted algorithm container instance; a deletion module, configured to delete the to-be-deleted algorithm container instance corresponding to the to-be-deleted algorithm container identifier; where the receiving module is further configured to receive a deployment instruction that includes a to-be-deployed algorithm description file and that is sent by the monitoring system; a parsing module, configured to parse the to-be-deployed algorithm description file to obtain at least one file identifier, where the at least one file identifier is an identifier of at least one to-be-deployed algorithm image file, and a to-be-deployed algorithm is encapsulated in the at least one to-be-deployed algorithm image file; an obtaining module, configured to obtain the at least one to-be-deployed algorithm image file based on the identifier of the to-be-deployed algorithm image file; and a generation module, configured to generate a to-be-deployed algorithm container instance based on the at least one to-be-deployed algorithm image file, where the to-be-deployed algorithm runs in the to-be-deployed algorithm container instance.

In a possible implementation of the second aspect, the obtaining module is specifically configured to: determine, based on the identifier of the to-be-deployed algorithm image file, a first to-be-deployed algorithm image file that is not stored in the internet protocol camera and a second to-be-deployed algorithm image file that is stored in the internet protocol camera; send a request for obtaining the first to-be-deployed algorithm image file to the monitoring system; receive the first to-be-deployed algorithm image file sent by the monitoring system; and constitute the at least one to-be-deployed algorithm image file by using the first to-be-deployed algorithm image file and the second to-be-deployed algorithm image file.

In a possible implementation of the second aspect, the obtaining module is specifically configured to: determine, based on the identifier of the to-be-deployed algorithm image file, the at least one to-be-deployed algorithm image file that is not stored in the internet protocol camera; send, to the monitoring system, a request for obtaining the at least one to-be-deployed algorithm image file; and receive the at least one to-be-deployed algorithm image file sent by the monitoring system.

In a possible implementation of the second aspect, the obtaining module is specifically configured to: determine, based on the identifier of the to-be-deployed algorithm image file, the at least one to-be-deployed algorithm image file that is stored in the internet protocol camera; and obtain the at least one to-be-deployed algorithm image file.

In a possible implementation of the second aspect, the generation module is specifically configured to: generate a to-be-deployed algorithm container image based on a container engine and the to-be-deployed algorithm description file, where the container engine is preset in the internet protocol camera; and create the to-be-deployed algorithm container instance based on the to-be-deployed algorithm container image and the at least one to-be-deployed algorithm image file.

In a possible implementation of the second aspect, the deletion module is further configured to: determine a to-be-deleted algorithm container image and at least one to-be-deleted algorithm image file that correspond to the to-be-deleted algorithm container identifier, where the to-be-deleted algorithm is encapsulated in the at least one to-be-deleted algorithm image file; and delete the to-be-deleted algorithm container image and the at least one to-be-deleted algorithm image file.

According to a third aspect, an embodiment of this application provides an internet protocol camera. The internet protocol camera includes one or more processors and a memory, where the one or more processors are configured to: read software code stored in the memory, and perform the method in any one of the first aspect or the possible implementations of the first aspect.

According to a fourth aspect, an embodiment of this application provides a computer-readable storage medium. The computer-readable storage medium stores software code, and the software code can be used to perform the method in any one of the first aspect or the possible implementations of the first aspect after being read by one or more processors.

According to a fifth aspect, an embodiment of this application provides a computer program product including an instruction. When the computer program product runs on a computer or a processor, the computer or the processor is enabled to perform the method in any one of the first aspect or the possible implementations of the first aspect.

DESCRIPTION OF EMBODIMENTS

Before embodiments of this application are described, a related concept of a container is first described.

An algorithm image file package includes one description file and at least one algorithm image file, and both the description file and the algorithm image file are files stored in a terminal. The description file includes an identifier of the algorithm image file package and an identifier of the at least one algorithm image file, and an algorithm, a service runtime library, a root file system, and the like are encapsulated in the at least one algorithm image file.

A container engine is an application program. The container engine may parse the description file to generate a container image, and the container engine may further use the container image and mount the at least one algorithm image file to generate a container instance.

The container image is a template of the container instance generated by the container engine by using the description file. The container engine may generate one or more container instances by using the container image.

The container instance is generated by the container engine by using the container image and mounting the at least one algorithm image file, and an algorithm running in the container instance is the algorithm encapsulated in the at least one algorithm image file.

The algorithm running in the container instance is used to process an image.

Figure 1:
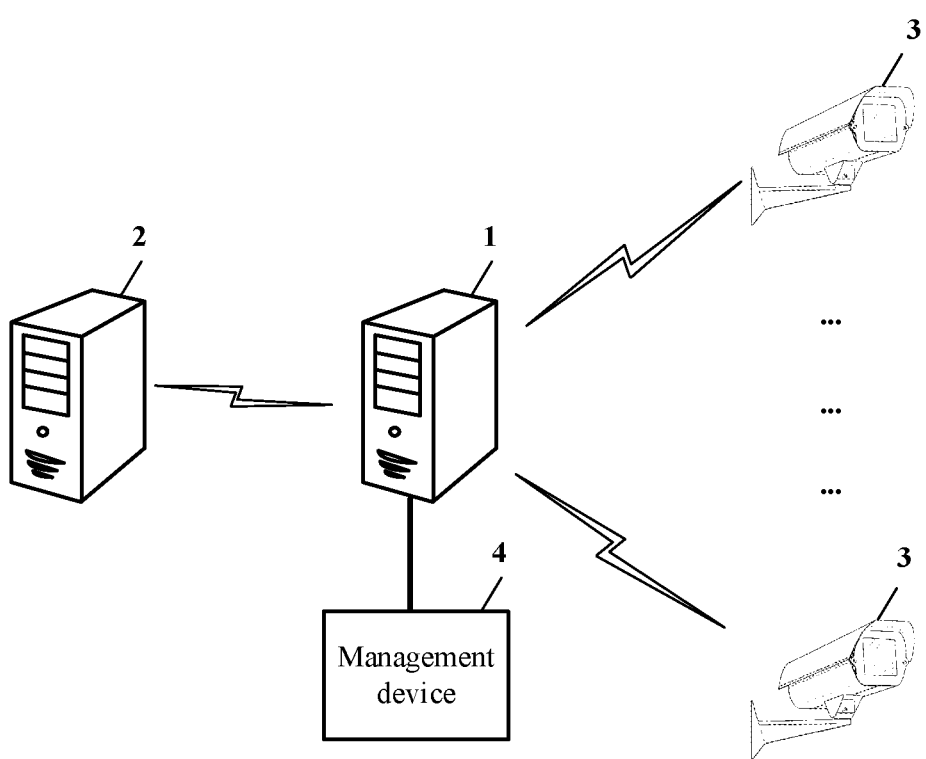
FIG. 1 is a schematic diagram of an algorithm update scenario according to an embodiment of this application.
Figure 2:
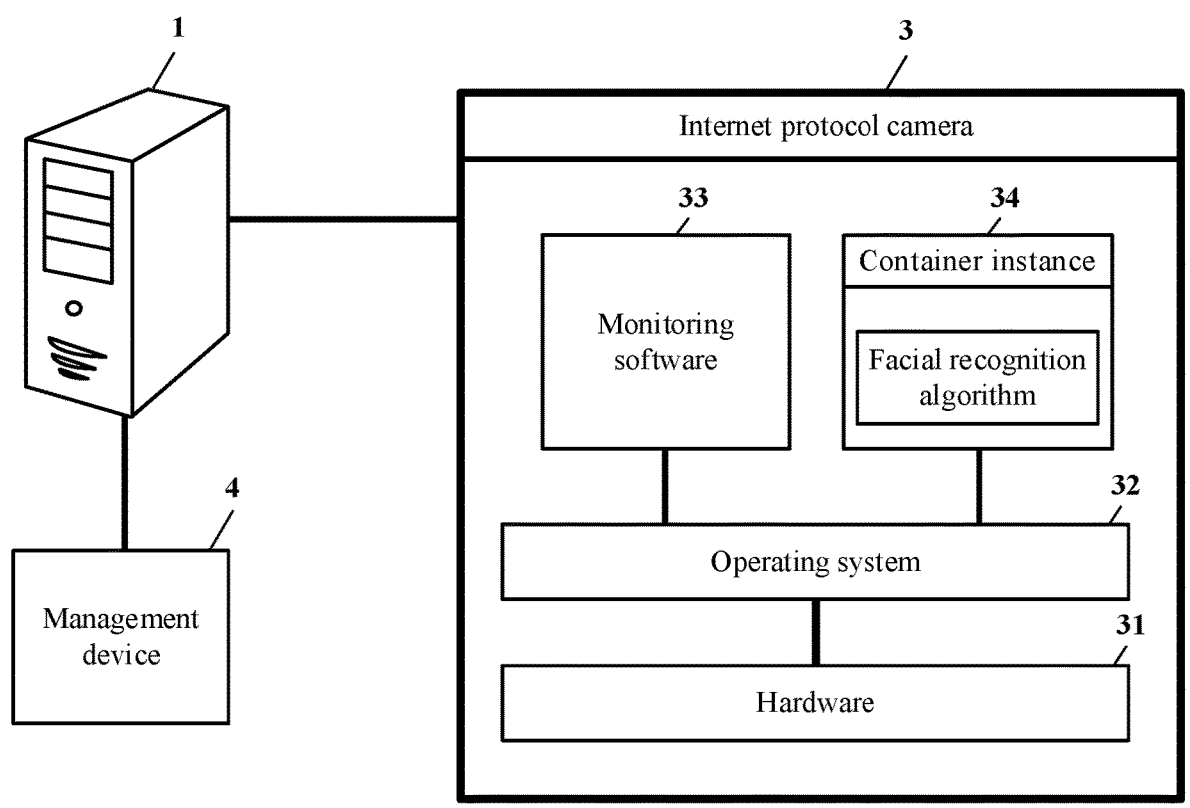
FIG. 2 is a schematic diagram of an internet protocol camera according to an embodiment of this application.
Figure 3:
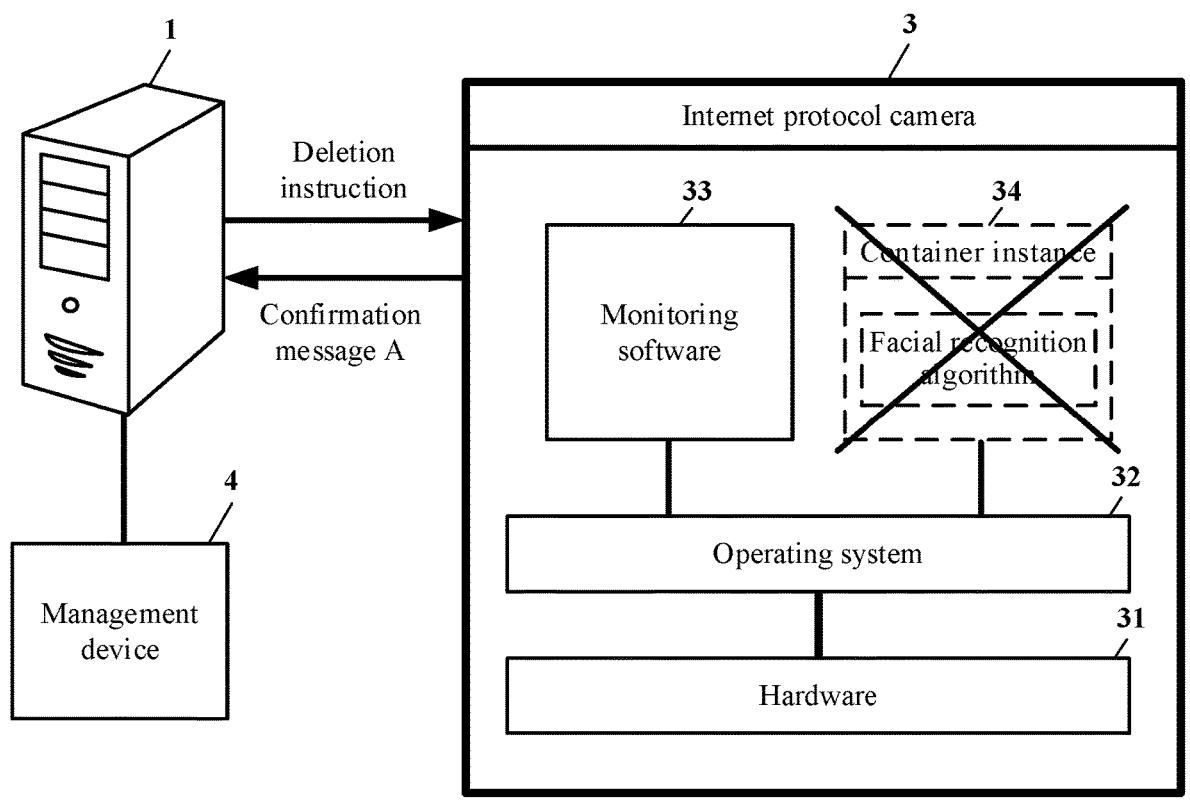
FIG. 3 is a schematic diagram of deleting a container instance by an internet protocol camera according to an embodiment of this application.
Figure 4:
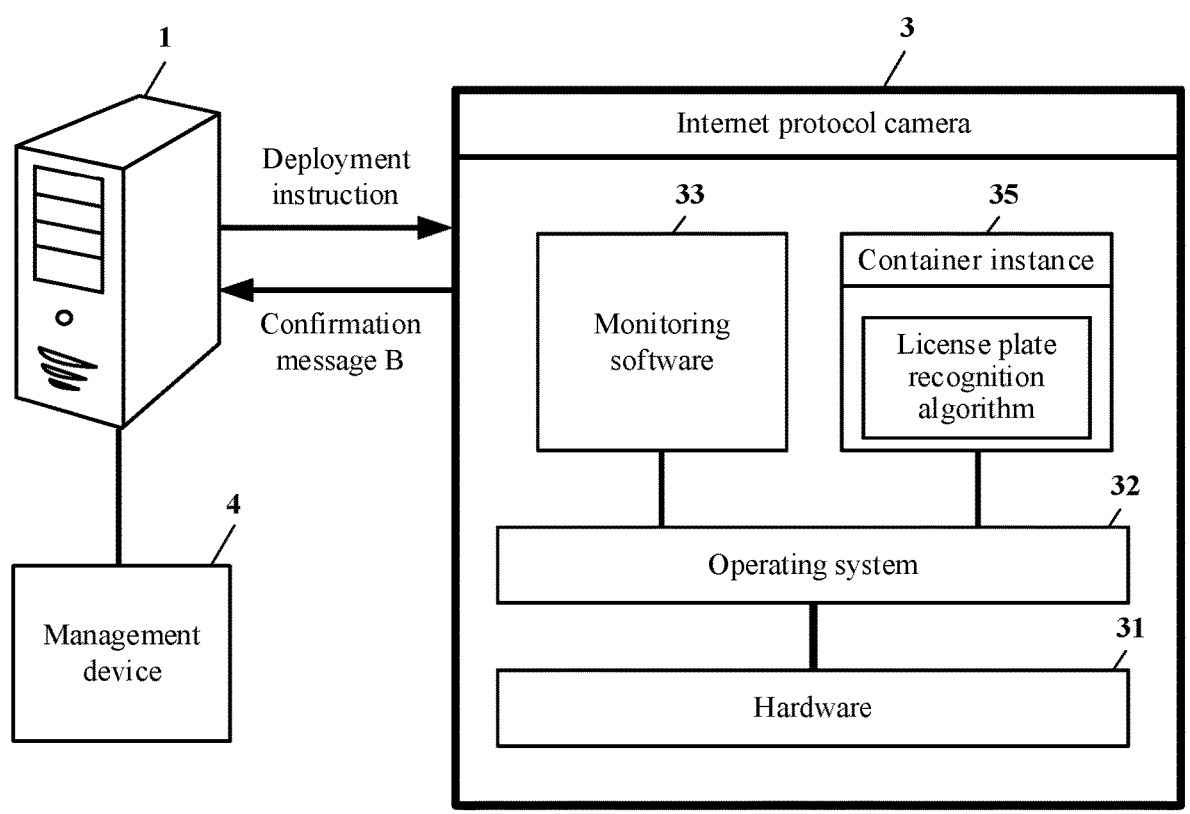
FIG. 4 is a schematic diagram of deploying a container instance by an internet protocol camera according to an embodiment of this application.

FIG. 1 is a schematic diagram of an algorithm update scenario according to an embodiment of this application. FIG. 2 is a schematic diagram of an internet protocol camera according to an embodiment of this application. FIG. 3 is a schematic diagram of deleting a container instance by an internet protocol camera according to an embodiment of this application. FIG. 4 is a schematic diagram of deploying a container instance by an internet protocol camera according to an embodiment of this application.

In the embodiment shown in FIG. 1, a device in FIG. 1 includes a monitoring system 1, an image server 2, a plurality of internet protocol cameras 3, and a management device 4. The image server 2 is configured to provide the monitoring system 1 with an algorithm image file package in which an algorithm is encapsulated. The monitoring system 1 is configured to update an algorithm of the internet protocol camera 3 based on a control instruction sent by the management device 4 and the algorithm image file package provided by the image server 2. The internet protocol camera 3 is configured to process an image based on the algorithm provided by the monitoring system 1.

FIG. 2 to FIG. 4 show a process in which the monitoring system 1 updates a facial recognition algorithm in the internet protocol camera 3 to a license plate recognition algorithm. Certainly, in this embodiment of this application, a version of a same algorithm may alternatively be upgraded.

The internet protocol camera shown in FIG. 2 is in a status before the algorithm is updated. A device in FIG. 2 includes the monitoring system 1, the internet protocol camera 3, and the management device 4. An operating system 32 runs on hardware 31 of the internet protocol camera 3, monitoring software 33 and a container instance 34 run on the operating system 32, and the monitoring software 33 is configured to implement functions such as image collection and remote communication.

In the embodiment shown in FIG. 2, a container identifier of the container instance 34 is "C-1", and the facial recognition algorithm running in the container instance 34 may recognize a face image in a collected image. The container instance 34 is generated by using an algorithm image file package in which the facial recognition algorithm is encapsulated. A storage path of the algorithm image file package in which the facial recognition algorithm is encapsulated is "/internet protocol camera/ . . . /RU", and an identifier of the algorithm image file package in which the facial recognition algorithm is encapsulated is "RL".

In the embodiment shown in FIG. 2, the internet protocol camera 3 further stores an algorithm image file package in which the license plate recognition algorithm is encapsulated. The license plate recognition algorithm may recognize a license plate image in the collected image. A storage path of the algorithm image file package in which the license plate recognition algorithm is encapsulated is "/internet protocol camera/ . . . /CP/", and an identifier of the algorithm image file package in which the license plate recognition algorithm is encapsulated is "CP". The license plate recognition algorithm does not run in a container instance of the internet protocol camera 3.

Table 1 shows an example of a mapping relationship table stored in the internet protocol camera 3.

TABLE 1

| Identifier of the algorithm image file package | Storage path of the algorithm image file package | Container identifier |
|---|---|---|
| RL | /internet protocol camera/.../RL/ | C-1 |
| CP | /internet protocol camera/.../CP/ | None |

Table 2 shows an example of a mapping relationship table that is about the internet protocol camera 3 and that is stored in the monitoring system 1.

TABLE 2

| Identifier of the algorithm image file package | Storage path of the algorithm image file package | Container identifier | Running status of the algorithm image file package |
|---|---|---|---|
| RL | /monitoring system/.../RL/ | C-1 | Running |
| CP | /monitoring system/.../CP/ | None | Not deployed |

In the embodiment shown in FIG. 2, the monitoring system 1 may learn a status of the internet protocol camera 3 according to Table 2. It may be learned from Table 2 that the monitoring system 1 may learn that the facial recognition algorithm is running in the container instance 34 whose container identifier is "C-1", and the license plate recognition algorithm does not run in the container instance of the internet protocol camera 3.

Referring to FIG. 3, the monitoring system 1 receives a deletion instruction that includes the container identifier "C-1" and that is sent by the management device 4, and a deployment instruction that includes the identifier "CP" of the algorithm image file package and that is sent by the management device 4. Then, the monitoring system 1 sends the deletion instruction that includes the container identifier "C-1" to the internet protocol camera 3. After the internet protocol camera 3 receives the deletion instruction that includes the container identifier "C-1" and that is sent by the monitoring system 1, the internet protocol camera 3 finds the container instance 34 corresponding to the container identifier "C-1", and deletes the container instance 34 running the facial recognition algorithm. Finally, the internet protocol camera 3 sends, to the monitoring system 1, a confirmation message A that indicates that the container instance 34 corresponding to the container identifier "C-1" is successfully deleted.

Table 3 shows an example of an updated mapping relationship table stored in the internet protocol camera 3.

TABLE 3

| Identifier of the algorithm image file package | Storage path of the algorithm image file package | Container identifier |
|---|---|---|
| RL | /internet protocol camera/.../RL/ | None |
| CP | /internet protocol camera/.../CP/ | None |

It may be learned from Table 3 that, after the internet protocol camera 3 deletes the container instance 34 corresponding to the container identifier "C-1", the internet protocol camera 3 needs to update a locally stored mapping relationship table, to be specific, the internet protocol camera 3 fills "none" in a cell of the container identifier corresponding to "RL" in Table 3.

Table 4 shows an example of an updated mapping relationship table that is about the internet protocol camera 3 and that is stored in the monitoring system 1.

TABLE 4

| Identifier of the algorithm image file package | Storage path of the algorithm image file package | Container identifier | Running status of the algorithm image file package |
|---|---|---|---|
| RL | /monitoring system/.../RL/ | None | Not deployed |
| CP | /monitoring system/.../CP/ | None | Not deployed |

It may be learned from Table 4 that, after the monitoring system 1 receives the confirmation message A that is sent by the internet protocol camera 3 and that indicates that the container instance 34 corresponding to the container identifier "C-1" is successfully deleted, the monitoring system 1 needs to update the locally stored mapping relationship table, to be specific, the monitoring system 1 fills "none" in a cell of the container identifier corresponding to "RL" in Table 4. In addition, the monitoring system 1 further needs to fill "not deployed" in a cell of the running status of the algorithm image file package corresponding to "RL" in Table 4.

Referring to FIG. 4, after the monitoring system 1 modifies the mapping relationship table, the monitoring system 1 obtains the identifier of the algorithm image file package in the deployment instruction sent by the management device 4, where the identifier of the algorithm image file package in the deployment instruction is "CP". The monitoring system 1 may determine, in Table 6, the storage path "/monitoring system/ . . . /CP/" of the algorithm image file package corresponding to "CP", and find the algorithm image file package of the license plate recognition algorithm by using the storage path "/monitoring system/ . . . /CP/". The monitoring system 1 extracts a description file from the algorithm image file package of the license plate recognition algorithm, and the monitoring system 1 sends the deployment instruction that includes the description file to the internet protocol camera 3. The algorithm image file package of the license plate recognition algorithm includes the description file and at least one algorithm image file, where the description file includes the identifier of the algorithm image file package and an identifier of the at least one algorithm image file, and the at least one algorithm image file includes one algorithm image file or at least two algorithm image files.

In the embodiment shown in FIG. 4, it is assumed that at least one algorithm image file includes three algorithm image files, and the three algorithm image files are respectively a first algorithm image file in which the license plate recognition algorithm is encapsulated, a second algorithm image file in which a service runtime library is encapsulated, and a third algorithm image file in which a root file system is encapsulated. An identifier of the first algorithm image file is JX-1, an identifier of the second algorithm image file is JX-2, and an identifier of the third algorithm image file is JX-3.

In the embodiment shown in FIG. 4, after the internet protocol camera 3 receives the deployment instruction that is sent by the monitoring system 1 and that includes the description file, the internet protocol camera 3 parses the description file to obtain the identifier of the algorithm image file package and the identifiers of the three algorithm image files. The obtained identifier of the algorithm image file package is "CP", and the obtained identifiers of the three algorithm image files are JX-1, JX-2, and JX-3. The internet protocol camera 3 finds, according to Table 5, the storage path "/internet protocol camera/ . . . /CP/" of the algorithm image file package corresponding to "CP", and obtains, from the storage path "/internet protocol camera/ . . . /CP/" of the algorithm image file package, the three algorithm image files corresponding to the identifiers (JX-1, JX-2, and JX-3) of the three algorithm image files. Then, the internet protocol camera 3 generates a container instance 35 based on the obtained three algorithm image files, where the license plate recognition algorithm runs in the container instance 35, and a container identifier of the container instance 35 is "C-2". Finally, the internet protocol camera 3 sends a confirmation message B to the monitoring system 1, where the confirmation message B indicates that the container instance 35 running the license plate recognition algorithm is successfully generated, and the container identifier of the container instance 35 is "C-2".

Table 5 shows an example of an updated mapping relationship table stored in the internet protocol camera 3.

TABLE 5

| Identifier of the algorithm image file package | Storage path of the algorithm image file package | Container identifier |
|---|---|---|
| RL | /internet protocol camera/.../RL/ | None |
| CP | /internet protocol camera/.../CP/ | C-2 |

It may be learned from Table 5 that the internet protocol camera 3 has generated the container instance 35 running the license plate recognition algorithm, and the container identifier of the container instance 35 is "C-2". The internet protocol camera 3 needs to update the locally stored mapping relationship table, to be specific, the internet protocol camera 3 fills "C-2" in a cell of the container identifier corresponding to "CP" in Table 5, to indicate that the license plate recognition algorithm runs in the container instance 35 corresponding to the container identifier "C-2".

Table 6 shows an example of an updated mapping relationship table that is about the internet protocol camera 3 and that is stored in the monitoring system 1.

TABLE 6

| Identifier of the algorithm image file package | Storage path of the algorithm image file package | Container identifier | Running status of the algorithm image file package |
|---|---|---|---|
| RL | /monitoring system/.../RL/ | None | Not deployed |
| CP | /monitoring system/.../CP/ | C-2 | Running |

It may be learned from Table 6 that, after the monitoring system 1 receives the confirmation message B sent by the internet protocol camera 3, the monitoring system 1 needs to update the locally stored mapping relationship table, to be specific, the monitoring system 1 fills "C-2" in a cell of the container identifier corresponding to "CP" in Table 6, to indicate that the license plate recognition algorithm runs in the container instance 35 corresponding to the container identifier "C-2". In addition, the monitoring system 1 further needs to fill "running" in a cell of the running status of the algorithm image file package corresponding to "CP" in Table 6.

In the embodiments shown in FIG. 2 to FIG. 4, normal running of the internet protocol camera 3 is not affected in a process in which the internet protocol camera 3 deletes the container instance 34 running the facial recognition algorithm, and in a process in which the internet protocol camera 3 deploys the container instance 35 running the license plate recognition algorithm. Therefore, an algorithm update method provided in an embodiment of this application can improve stability of the internet protocol camera 3 in the process of updating the algorithm.

The foregoing briefly describes the algorithm update scenario and process of the internet protocol camera 3 by using the embodiments shown in FIG. 1 to FIG. 4. The following describes in detail an algorithm update method and an apparatus provided in the embodiments of this application.

Figure 5:
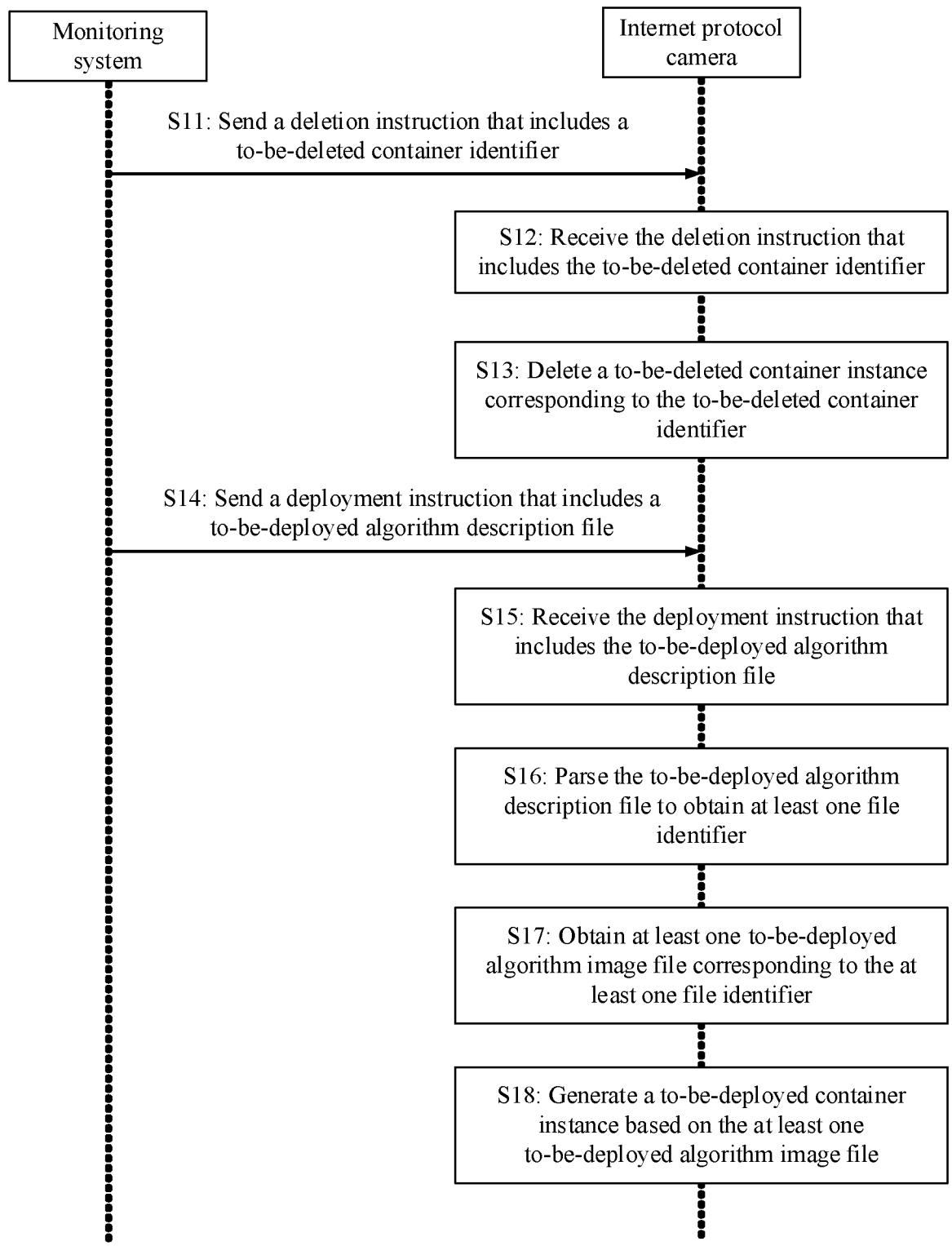
FIG. 5 is a flowchart of an algorithm update method according to an embodiment of this application.

FIG. 5 is a flowchart of an algorithm update method according to an embodiment of this application. The algorithm update method shown in FIG. 5 can improve stability of an internet protocol camera in a process of updating an algorithm. The method shown in FIG. 5 includes the following steps.

Step S11: A monitoring system sends a deletion instruction that includes a to-be-deleted algorithm container identifier to an internet protocol camera.

The to-be-deleted algorithm container identifier in the deletion instruction is an identifier of a to-be-deleted algorithm container instance in the internet protocol camera, and a to-be-deleted algorithm runs in the to-be-deleted algorithm container instance.

Step S12: The internet protocol camera receives the deletion instruction that includes the to-be-deleted algorithm container identifier and that is sent by the monitoring system.

After the monitoring system sends the deletion instruction that includes the to-be-deleted algorithm container identifier to the internet protocol camera, the internet protocol camera receives the deletion instruction that includes the to-be-deleted algorithm container identifier and that is sent by the monitoring system.

Step S13: The internet protocol camera deletes the to-be-deleted algorithm container instance corresponding to the to-be-deleted algorithm container identifier.

The internet protocol camera finds the to-be-deleted algorithm container instance corresponding to the to-be-deleted algorithm container identifier, and deletes the to-be-deleted algorithm container instance corresponding to the to-be-deleted algorithm container identifier.

For example, referring to FIG. 3, the container instance 34 shown in FIG. 3 is the to-be-deleted algorithm container instance, and the facial recognition algorithm in the container instance 34 is the to-be-deleted algorithm running in the to-be-deleted algorithm container instance.

For step S11 to step S13, refer to the embodiment shown in FIG. 3. The embodiment shown in FIG. 3 is a detailed process in which the internet protocol camera deletes the container instance based on the deletion instruction sent by the monitoring system.

Step S14: The monitoring system sends a deployment instruction that includes a to-be-deployed algorithm description file to the internet protocol camera.

There are a plurality of manners of performing step S11 and step S14 in sequence.

In a first manner, step S11 may be first performed, and then step S14 is performed. For example, the monitoring system may first send, to the internet protocol camera, the deletion instruction that includes the to-be-deleted algorithm container identifier, and then the monitoring system sends, to the internet protocol camera, the deployment instruction that includes the to-be-deployed algorithm description file.

In a second manner, step S11 and step S14 may be simultaneously performed. For example, the monitoring system may send, to the internet protocol camera, the deletion instruction that includes the to-be-deleted algorithm container identifier and the deployment instruction that includes the to-be-deployed algorithm description file.

In a third manner, step S14 may be performed, and then step S11 is performed. For example, the monitoring system first sends the deployment instruction that includes the to-be-deployed algorithm description file to the internet protocol camera, and then the monitoring system sends the deletion instruction that includes the to-be-deleted algorithm container identifier to the internet protocol camera.

Step S15: The internet protocol camera receives the deployment instruction that includes the to-be-deployed algorithm description file and that is sent by the monitoring system.

Step S16: The internet protocol camera parses the to-be-deployed algorithm description file to obtain at least one file identifier.

Each file identifier corresponds to a to-be-deployed algorithm image file, and a to-be-deployed algorithm is encapsulated in the to-be-deployed algorithm image file.

The at least one file identifier includes one file identifier or at least two file identifiers, and at least one algorithm image file includes one algorithm image file or at least two algorithm image files. For example, when the at least one file identifier includes one file identifier, the at least one algorithm image file includes one algorithm image file. For another example, when the at least one file identifier includes two file identifiers, the at least one algorithm image file includes two algorithm image files. For still another example, when the at least one file identifier includes three file identifiers, the at least one algorithm image file includes three algorithm image files.

For example, an assumption 1 is made: The at least one algorithm image file includes three algorithm image files, and the three algorithm image files are respectively a first algorithm image file in which a license plate recognition algorithm is encapsulated, a second algorithm image file in which a service runtime library is encapsulated, and a third algorithm image file in which a root file system is encapsulated. An identifier of the first algorithm image file is JX-1, an identifier of the second algorithm image file is JX-2, and an identifier of the third algorithm image file is JX-3.

Step S17: The internet protocol camera obtains the at least one to-be-deployed algorithm image file corresponding to the at least one file identifier.

There are a plurality of cases in which the internet protocol camera obtains the at least one to-be-deployed algorithm image file corresponding to the at least one file identifier, and the plurality of cases are described in detail in the following embodiments.

Step S18: The internet protocol camera generates a to-be-deployed algorithm container instance based on the at least one to-be-deployed algorithm image file, where a to-be-deployed algorithm runs in the to-be-deployed algorithm container instance.

For example, referring to FIG. 4, the container instance 35 shown in FIG. 4 is the to-be-deployed algorithm container instance, and the license plate recognition algorithm in the container instance 35 is the to-be-deployed algorithm running in the to-be-deployed algorithm container instance.

For step S14 to step S18, refer to the embodiment shown in FIG. 4. The embodiment shown in FIG. 4 is a detailed process in which the internet protocol camera deploys the container instance based on the deployment instruction sent by the monitoring system.

In the embodiment shown in FIG. 5, normal running of the internet protocol camera is not affected in a process in which the internet protocol camera deletes the to-be-deleted algorithm container instance in which the to-be-deleted algorithm runs, and in a process in which the internet protocol camera deploys the to-be-deployed algorithm container instance in which the to-be-deployed recognition algorithm runs. Therefore, the algorithm update method provided in this embodiment of this application can improve stability of the internet protocol camera in a process of updating an algorithm.

In a possible implementation of the embodiment shown in FIG. 5, that the internet protocol camera generates the to-be-deployed algorithm container instance based on the at least one to-be-deployed algorithm image file may further includes: generating, by the internet protocol camera, a to-be-deployed algorithm container image based on a container engine and the to-be-deployed algorithm description file, where the container engine is preset in the internet protocol camera; and creating, by the internet protocol camera, the to-be-deployed algorithm container instance based on the to-be-deployed algorithm container image and the at least one to-be-deployed algorithm image file.

The container engine is pre-deployed in the internet protocol camera, and the to-be-deployed algorithm description file and the algorithm image file in the internet protocol camera are ready. First, the container engine in the internet protocol camera generates one to-be-deployed algorithm container image by parsing the to-be-deployed algorithm description file. The to-be-deployed algorithm container image is a static template about a container instance used in the container engine, and the to-be-deployed algorithm container image may be used to generate one or more dynamic container instances. Then, the container engine generates the to-be-deployed algorithm container instance by using the to-be-deployed algorithm container image and mounting the associated at least one to-be-deployed algorithm image file, and the to-be-deployed algorithm runs in the to-be-deployed algorithm container instance.

Figure 6:
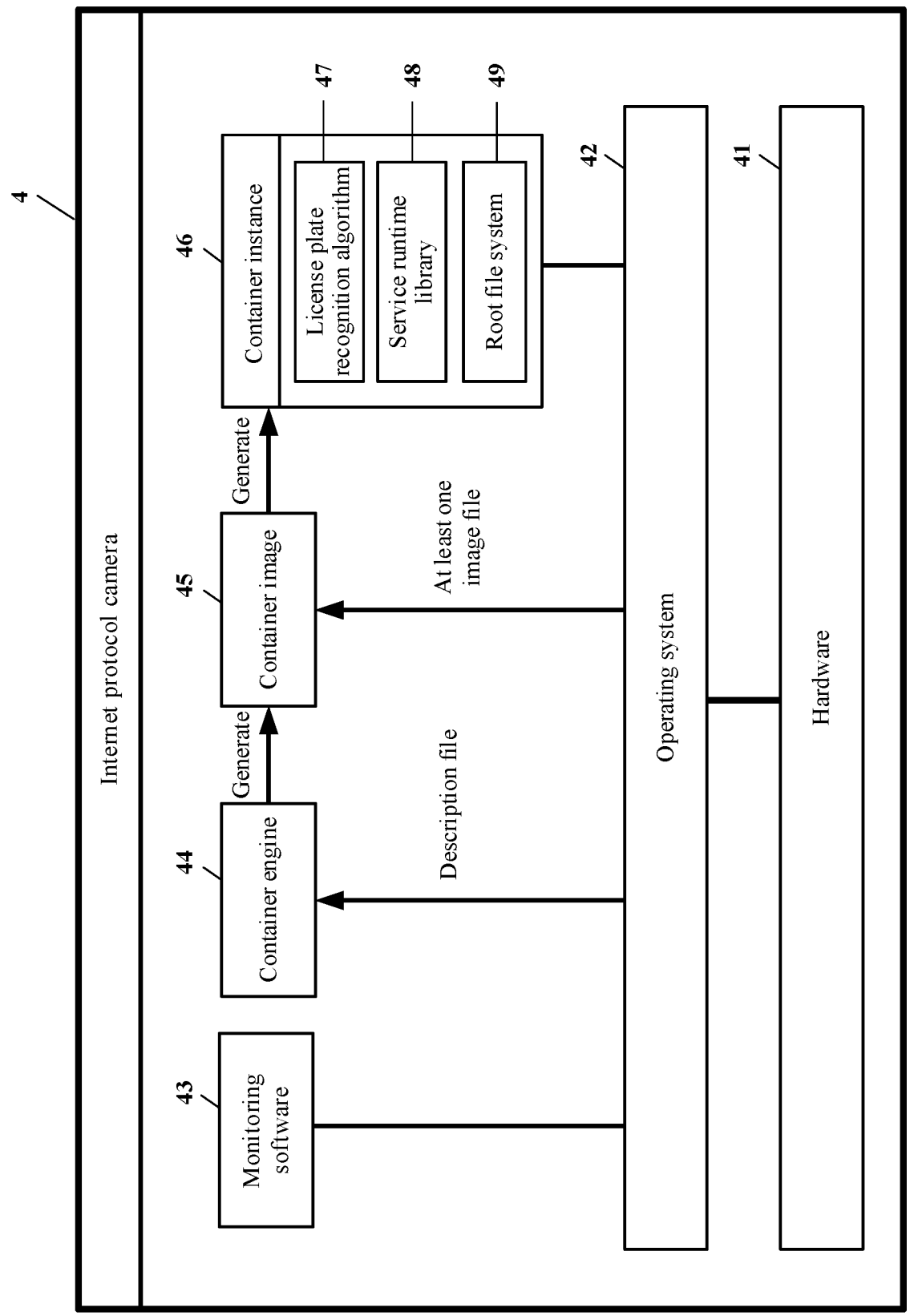
FIG. 6 is a schematic diagram of generating a container instance by an internet protocol camera according to an embodiment of this application.

For example, reference is made to the assumption 1 and FIG. 6. FIG. 6 is a schematic diagram of generating a container instance by an internet protocol camera according to an embodiment of this application. An operating system 42 runs on hardware 41 of the internet protocol camera 4 in FIG. 6, monitoring software 43 and a container engine 44 run on the operating system 42, and the monitoring software 43 is configured to implement functions such as image collection and remote communication. After obtaining a description file and at least one algorithm image file, the internet protocol camera 4 may generate a container image 45 based on the container engine 44 and the description file, and create a container instance 46 based on the container image 45 and at least one to-be-deployed algorithm image file. A license plate recognition algorithm 47, a service runtime library 48, and a root file system 49 run in the container instance 46.

In another possible implementation of the embodiment shown in FIG. 5, after step S13, that is, after the internet protocol camera deletes the to-be-deleted algorithm container instance corresponding to the to-be-deleted algorithm container identifier, the embodiment shown in FIG. 5 may further include: determining, by the internet protocol camera, a to-be-deleted algorithm container image and at least one to-be-deleted algorithm image file that correspond to the to-be-deleted algorithm container identifier, where the to-be-deleted algorithm is encapsulated in the at least one to-be-deleted algorithm image file; and deleting, by the internet protocol camera, the to-be-deleted algorithm container image and the at least one to-be-deleted algorithm image file.

For example, referring to FIG. 6, it is assumed that the container instance 46 in FIG. 6 is the to-be-deleted algorithm container instance corresponding to the to-be-deleted algorithm container identifier, the container image 45 is the to-be-deleted algorithm container image corresponding to the to-be-deleted algorithm container identifier, and the at least one algorithm image file in FIG. 6 is stored in a memory of the internet protocol camera 4. After the internet protocol camera 4 deletes the container instance 46, the internet protocol camera 4 further needs to delete the container image 45 and the at least one algorithm image file stored in the memory of the internet protocol camera 4, so that a storage resource of the internet protocol camera 4 can be saved.

Figure 7:
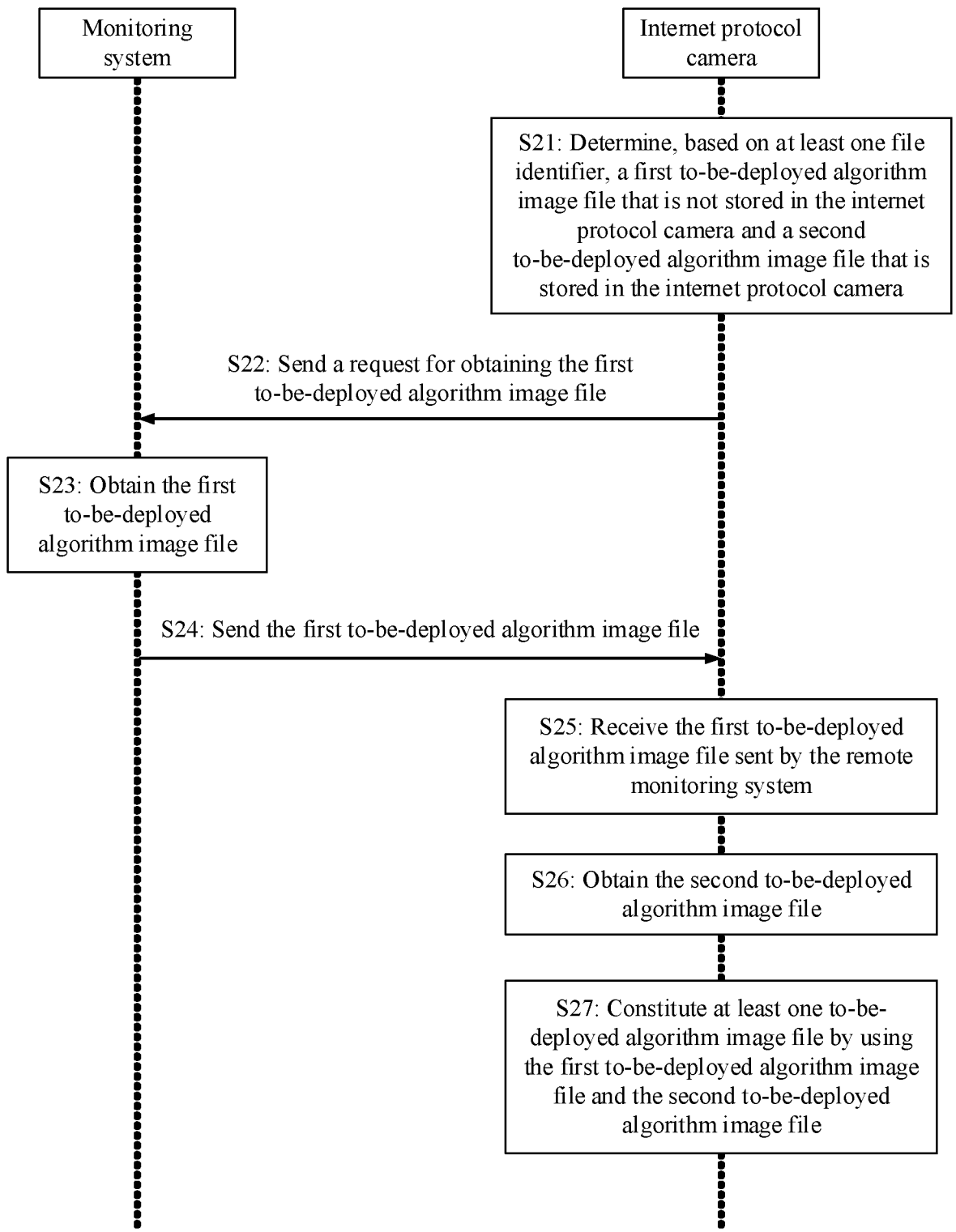
FIG. 7 is a flowchart of another algorithm update method according to an embodiment of this application.

FIG. 7 is a flowchart of another algorithm update method according to an embodiment of this application. The embodiment shown in FIG. 7 is an embodiment extended based on the embodiment shown in FIG. 5, to be specific, step S17 in FIG. 5 may further include the following steps.

Step S21: The internet protocol camera determines, based on the at least one file identifier, a first to-be-deployed algorithm image file that is not stored in the internet protocol camera and a second to-be-deployed algorithm image file that is stored in the internet protocol camera.

In the at least one file identifier obtained by the internet protocol camera by parsing the to-be-deployed algorithm description file, if the internet protocol camera determines, based on the at least one file identifier, that the first to-be-deployed algorithm image file is not stored in the internet protocol camera, and determines that the second to-be-deployed algorithm image file is stored in the internet protocol camera, it indicates that the second to-be-deployed algorithm image file may be reused, and the internet protocol camera needs to obtain the first to-be-deployed algorithm image file from the monitoring system.

Certainly, the internet protocol camera may further determine, according to a mapping relationship between a file identifier and a storage path, whether a to-be-deployed algorithm image file corresponding to the file identifier is stored in the internet protocol camera. The internet protocol camera may maintain a file list of a stored algorithm image file, and the file list may include information such as an identifier, a size, a version, and a storage path of the stored algorithm image file. The internet protocol camera may determine, by querying the file list and comparing the at least one file identifier, the first algorithm image file that has not been stored in the internet protocol camera and a corresponding first file identifier, and the second algorithm image file that has been stored in the internet protocol camera and a corresponding second file identifier.

For example, reference is made to Table 7. Table 7 shows an example of a table that is of a mapping relationship between a file identifier and a storage path and that is stored in the internet protocol camera. In Table 7, a file identifier "JX-1" does not correspond to a file storage path, but a file identifier "JX-2" corresponds to a file storage path "/internet protocol camera/ . . . /JX-2". This indicates that a to-be-deployed algorithm image file corresponding to the file identifier "JX-1" is not stored in the internet protocol camera, but a to-be-deployed algorithm image file corresponding to the file identifier "JX-2" is stored in the network camera.

TABLE 7

| File identifier | File storage path corresponding to the file identifier |
|---|---|
| JX-1 | None |
| JX-2 | /internet protocol camera/.../JX-2 |

In step S21, the first to-be-deployed algorithm image file is not stored in the internet protocol camera, and the internet protocol camera needs to obtain the first to-be-deployed algorithm image file from the monitoring system. The second to-be-deployed algorithm image file is stored in the internet protocol camera, and the internet protocol camera may locally obtain the second to-be-deployed algorithm image file.

In step S21, there may be one first to-be-deployed algorithm image file, or there may be two or more first to-be-deployed algorithm image files. There may be one second to-be-deployed algorithm image file, or there may be two or more second to-be-deployed algorithm image files.

For example, assuming that a quantity of to-be-deployed algorithm image files corresponding to the at least one file identifier is 5, and a quantity of first to-be-deployed algorithm image files is 3, a quantity of second to-be-deployed algorithm image files=5−3=2.

For another example, assuming that a quantity of to-be-deployed algorithm image files corresponding to the at least one file identifier is 5, and a quantity of first to-be-deployed algorithm image files is 1, a quantity of second to-be-deployed algorithm image files=5−1=4.

Step S22: The internet protocol camera sends, to the monitoring system, a request for obtaining the first to-be-deployed algorithm image file.

Step S23: The monitoring system obtains the first to-be-deployed algorithm image file.

The monitoring system may directly obtain the corresponding first to-be-deployed algorithm image file.

Certainly, the monitoring system may further obtain, according to the mapping relationship between a file identifier and a storage path, the first to-be-deployed algorithm image file corresponding to the first file identifier.

For example, reference is made to Table 8. Table 8 shows an example of a table that is of a mapping relationship between a file identifier and a storage path and that is stored in the monitoring system. After the monitoring system receives the request that is sent by the internet protocol camera and that is for obtaining the first to-be-deployed algorithm image file corresponding to the first file identifier, the monitoring system parses out the first file identifier in the request. It is assumed that the first file identifier is "JX-1". Then, the monitoring system finds, by using Table 8, a file storage path "/monitoring system/ . . . /JX-1" corresponding to the file identifier "JX-1", and obtains the to-be-deployed algorithm image file corresponding to the file identifier "JX-1" by using the file storage path "/monitoring system/ . . . /JX-1".

TABLE 8

| File identifier | File storage path corresponding to the file identifier |
|---|---|
| JX-1 | /monitoring system/.../JX-1 |
| JX-2 | /monitoring system/.../JX-2 |

Step S24: The monitoring system sends the first to-be-deployed algorithm image file to the internet protocol camera.

After obtaining the first to-be-deployed algorithm image file, the monitoring system may send the first to-be-deployed algorithm image file to the internet protocol camera.

Step S25: The internet protocol camera receives the first to-be-deployed algorithm image file sent by the monitoring system.

Step S26: The internet protocol camera obtains the second to-be-deployed algorithm image file.

The internet protocol camera may directly obtain the corresponding second to-be-deployed algorithm image file.

Certainly, the internet protocol camera may further obtain, by using the mapping relationship between a file identifier and a storage path, the second to-be-deployed algorithm image file corresponding to the second file identifier.

For example, referring to Table 7, assuming that the second file identifier is "JX-2", the internet protocol camera may obtain, from Table 7, the file storage path "/internet protocol camera/ . . . /JX-2" corresponding to the file identifier "JX-2", and obtain the to-be-deployed algorithm image file corresponding to the file identifier "JX-2" by using the file storage path "/internet protocol camera/ . . . /JX-2".

Step S27: The internet protocol camera constitutes the at least one to-be-deployed algorithm image file by using the first to-be-deployed algorithm image file and the second to-be-deployed algorithm image file.

In the embodiment shown in FIG. 7, if some to-be-deployed algorithm image files of the at least one to-be-deployed algorithm image file are stored in the internet protocol camera, and the other to-be-deployed algorithm image files are not stored in the internet protocol camera, the internet protocol camera needs to obtain, from the monitoring system, the to-be-deployed algorithm image file that is not stored in the internet protocol camera. There is no need to obtain all of the to-be-deployed algorithm image files from the monitoring system. This can save a network transmission resource.

In the embodiment shown in FIG. 7, one file storage path may be used to store only one to-be-deployed algorithm image file corresponding to one file identifier. For example, one file storage path "/internet protocol camera/ . . . /JX-2" in Table 7 is used to store only the to-be-deployed algorithm image file corresponding to the file identifier "JX-2". One file storage path may be alternatively used to store a plurality of to-be-deployed algorithm image files corresponding to a plurality of file identifiers. For example, it is assumed that one file storage path "/internet protocol camera/ . . . /JX-3-5" is used to store a to-be-deployed algorithm image file corresponding to a file identifier "JX-3", a to-be-deployed algorithm image file corresponding to a file identifier "JX-4", and a to-be-deployed algorithm image file corresponding to a file identifier "JX-5".

In a possible implementation of the embodiment shown in FIG. 7, in step S21, if the internet protocol camera determines that none of the at least one to-be-deployed algorithm image file corresponding to the at least one file identifier is stored in the internet protocol camera, the internet protocol camera may send, to the monitoring system, a request for obtaining the at least one to-be-deployed algorithm image file corresponding to the at least one file identifier, and the internet protocol camera receives the at least one to-be-deployed algorithm image file sent by the monitoring system.

In another possible implementation of the embodiment shown in FIG. 7, in step S21, if the internet protocol camera determines that the at least one to-be-deployed algorithm image file corresponding to the at least one file identifier is stored in the internet protocol camera, the internet protocol camera may directly obtain the at least one to-be-deployed algorithm image file corresponding to the at least one file identifier.

In the embodiment shown in FIG. 7, after the internet protocol camera parses the to-be-deployed algorithm description file to obtain the at least one file identifier, the internet protocol camera determines whether the at least one to-be-deployed algorithm image file corresponding to the at least one file identifier is stored in the internet protocol camera. The internet protocol camera may obtain, from the monitoring system, the to-be-deployed algorithm image file that is not stored in the internet protocol camera, or the internet protocol camera may reuse a locally pre-stored to-be-deployed algorithm image file. Therefore, the internet protocol camera may obtain, based on an actual case, the at least one to-be-deployed algorithm image file corresponding to the at least one file identifier.

Figure 8:
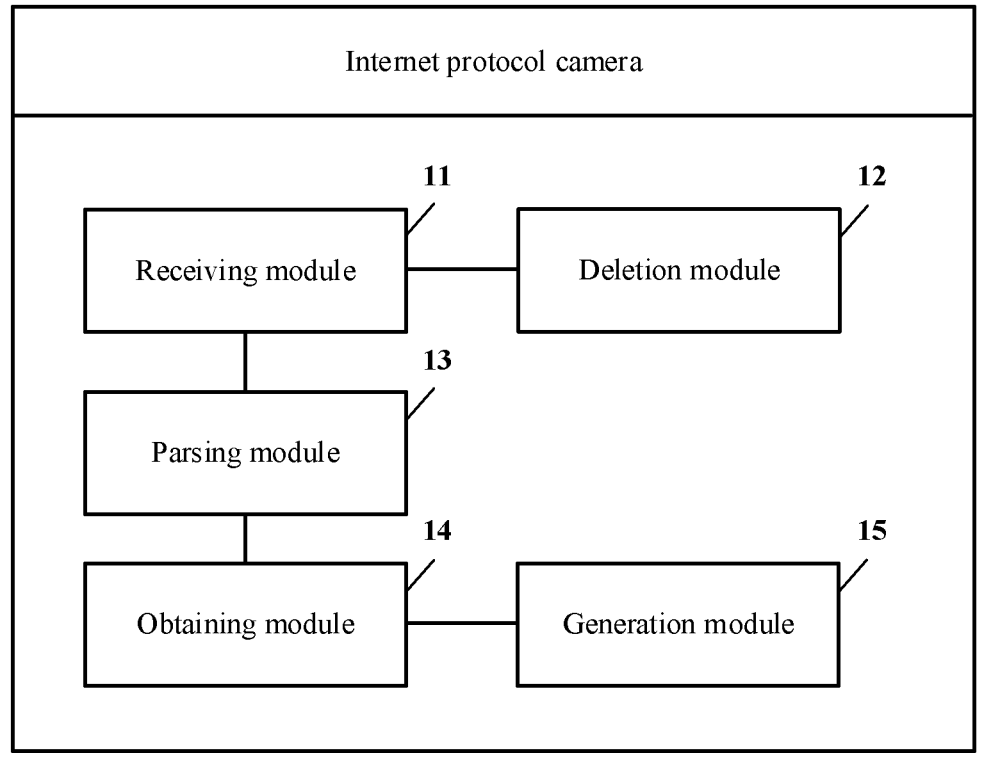
FIG. 8 is a schematic diagram of another internet protocol camera according to an embodiment of this application.

FIG. 8 is a schematic diagram of another internet protocol camera according to an embodiment of this application. The internet protocol camera includes the following modules.

A receiving module 11 is configured to receive a deletion instruction that includes a to-be-deleted algorithm container identifier and that is sent by a monitoring system, where the to-be-deleted algorithm container identifier in the deletion instruction is an identifier of a to-be-deleted algorithm container instance in the internet protocol camera, and a to-be-deleted algorithm runs in the to-be-deleted algorithm container instance. For a specific detailed implementation, refer to the detailed description corresponding to step S12 in the method embodiment shown in FIG. 5.

A deletion module 12 is configured to delete the to-be-deleted algorithm container instance corresponding to the to-be-deleted algorithm container identifier. For a specific detailed implementation, refer to the detailed description corresponding to step S13 in the method embodiment shown in FIG. 5.

The receiving module 11 is further configured to receive a deployment instruction that includes a to-be-deployed algorithm description file and that is sent by the monitoring system. For a specific detailed implementation, refer to the detailed description corresponding to step S15 in the method embodiment shown in FIG. 5.

A parsing module 13 is configured to parse the to-be-deployed algorithm description file to obtain at least one file identifier, where the at least one file identifier is an identifier of at least one to-be-deployed algorithm image file, and a to-be-deployed algorithm is encapsulated in the at least one to-be-deployed algorithm image file. For a specific detailed implementation, refer to the detailed description corresponding to step S16 in the method embodiment shown in FIG. 5.

An obtaining module 14 is configured to obtain the at least one to-be-deployed algorithm image file corresponding to the at least one file identifier. For a specific detailed implementation, refer to the detailed description corresponding to step S17 in the method embodiment shown in FIG. 5.

A generation module 15 is configured to generate a to-be-deployed algorithm container instance based on the at least one to-be-deployed algorithm image file, where the to-be-deployed algorithm runs in the to-be-deployed algorithm container instance. For a specific detailed implementation, refer to the detailed description corresponding to step S18 in the method embodiment shown in FIG. 5.

In an implementable embodiment, the obtaining module 14 is specifically configured to: determine, based on the at least one file identifier, a first to-be-deployed algorithm image file that is not stored in the internet protocol camera and a second to-be-deployed algorithm image file that is stored in the internet protocol camera; send a request for obtaining the first to-be-deployed algorithm image file to the monitoring system; receive the first to-be-deployed algorithm image file sent by the monitoring system; and constitute the at least one to-be-deployed algorithm image file by using the first to-be-deployed algorithm image file and the second to-be-deployed algorithm image file. For a specific detailed implementation, refer to the detailed descriptions corresponding to steps S21 to S27 in the method embodiment shown in FIG. 7.

In an implementable embodiment, the obtaining module 14 is specifically configured to: determine, based on the at least one file identifier, the at least one to-be-deployed algorithm image file that is not stored in the internet protocol camera; send, to the monitoring system, a request for obtaining the at least one to-be-deployed algorithm image file; and receive the at least one to-be-deployed algorithm image file sent by the monitoring system. For a specific detailed implementation, refer to the corresponding detailed description in the method embodiment shown in FIG. 7.

In an implementable embodiment, the obtaining module 14 is specifically configured to: determine, based on the at least one file identifier, the at least one to-be-deployed algorithm image file that is stored in the internet protocol camera; and obtain the at least one to-be-deployed algorithm image file. For a specific detailed implementation, refer to the corresponding detailed description in the method embodiment shown in FIG. 7.

In an implementable embodiment, the generation module 15 is specifically configured to: generate a to-be-deployed algorithm container image based on a container engine and the to-be-deployed algorithm description file, where the container engine is preset in the internet protocol camera; and create the to-be-deployed algorithm container instance based on the to-be-deployed algorithm container image and the at least one to-be-deployed algorithm image file. For a specific detailed implementation, refer to the corresponding detailed description in the method embodiment shown in FIG. 5.

In an implementable embodiment, the deletion module 12 is further configured to: determine a to-be-deleted algorithm container image and at least one to-be-deleted algorithm image file that correspond to the to-be-deleted algorithm container identifier, where the to-be-deleted algorithm is encapsulated in the at least one to-be-deleted algorithm image file; and delete the to-be-deleted algorithm container image and the at least one to-be-deleted algorithm image file. For a specific detailed implementation, refer to the corresponding detailed description in the method embodiment shown in FIG. 5.

Figure 9:
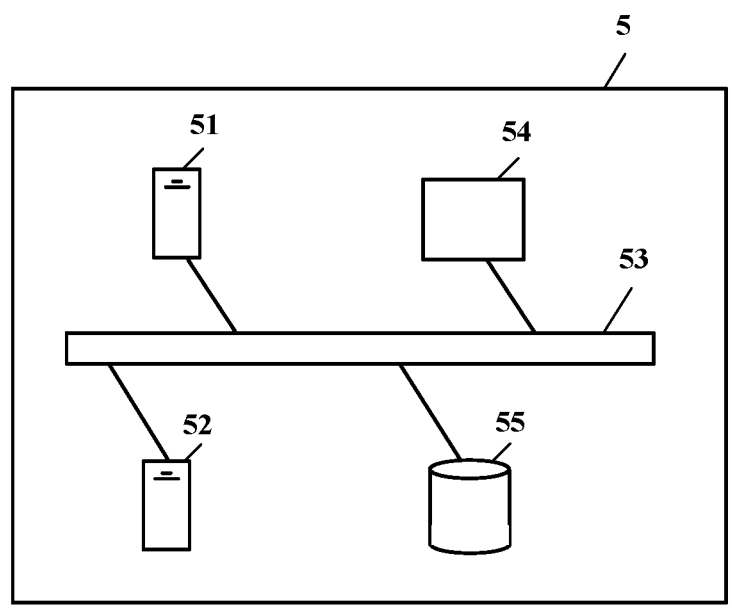
FIG. 9 is a schematic diagram of still another internet protocol camera according to an embodiment of this application.

FIG. 9 is a schematic diagram of still another internet protocol camera according to an embodiment of this application. The internet protocol camera 5 includes a central processing unit 51, an image processor 52, an I/O device 53, a memory 54, and a non-volatile memory (NVM) 55. The internet protocol camera 5 in FIG. 9 is equivalent to the internet protocol camera 3 in FIG. 1 to FIG. 4. For a detailed description of the internet protocol camera 5 in FIG. 9, refer to the detailed description of the internet protocol camera 3 in the embodiments corresponding to FIG. 1 to FIG. 4.

The internet protocol camera 5 shown in FIG. 9 may be applied to the method embodiments corresponding to FIG. 5 and FIG. 7. With reference to FIG. 5 and FIG. 9, the central processing unit 51 may receive, by using the I/O device 53, a deletion instruction that includes a to-be-deleted algorithm container identifier and that is sent by a monitoring system, and the central processing unit 51 may delete a to-be-deleted algorithm container instance corresponding to the to-be-deleted algorithm container identifier. The central processing unit 51 may receive, by using the I/O device 53, a deployment instruction that includes a to-be-deployed algorithm description file and that is sent by the monitoring system, and the central processing unit 51 may parse the to-be-deployed algorithm description file to obtain at least one file identifier. The central processing unit 51 may obtain, from the non-volatile memory 55 by using the I/O device 53, at least one to-be-deployed algorithm image file corresponding to the at least one file identifier, and the central processing unit 51 may generate a to-be-deployed algorithm container instance based on the at least one to-be-deployed algorithm image file.

In the embodiment shown in FIG. 9, for an execution process of the internet protocol camera 5, refer to the detailed descriptions in the method embodiments corresponding to FIG. 5 and FIG. 7.

All or some of the foregoing embodiments may be implemented by using software, hardware, firmware, or any combination thereof. When software is used to implement the embodiments, the embodiments may be implemented or partially in a form of a computer program product. The computer program product includes one or more computer instructions. When the computer program instructions are loaded and executed on a computer, the procedure or the functions according to the embodiments are all or partially generated. The computer may be a general-purpose computer, a special-purpose computer, a computer network, or another programmable apparatus. The computer program instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state disk (SSD)), or the like.

What is claimed is:

1. An algorithm update method comprising:
    receiving, by a camera, a deletion instruction sent by a monitoring system, the deletion instruction comprising a first algorithm container identifier, comprising an identifier of a first algorithm container instance in the camera, and a first algorithm runs in the first algorithm container instance;
    deleting, by the camera, the first algorithm container instance corresponding to the first algorithm container identifier;
    receiving, by the camera, a deployment instruction sent by the monitoring system comprising a second algorithm description file;
    parsing, by the camera, the second algorithm description file to obtain an identifier of a second algorithm image file, wherein a second algorithm is encapsulated in the second algorithm image file;
    obtaining, by the camera, the second algorithm image file based on the identifier of the second algorithm image file; and
    generating, by the camera, a second algorithm container instance based on the second algorithm image file, wherein the second algorithm runs in the second algorithm container instance.

2. The algorithm update method according to claim 1, wherein obtaining, by the camera, the second algorithm image file based on the identifier of the second algorithm image file comprises:
    determining, by the camera based on the identifier of the second algorithm image file, that a one second algorithm image file is not stored in the camera and another second algorithm image file is stored in the camera;
    sending, by the camera, a request for obtaining the one second algorithm image file to the monitoring system;
    receiving, by the camera, the one second algorithm image file sent by the monitoring system; and
    creating, by the camera, the second algorithm image file by using the one second algorithm image file and the other second algorithm image file.

3. The algorithm update method according to claim 1, wherein obtaining, by the camera, the second algorithm image file based on the identifier of the second algorithm image file comprises:

determining, by the camera based on the identifier of the second algorithm image file, that the second algorithm image file is not stored in the camera;
sending, by the camera to the monitoring system, a request for obtaining the second algorithm image file; and
receiving, by the camera, the second algorithm image file sent by the monitoring system.

4. The algorithm update method according to claim 1, wherein obtaining, by the camera, the second algorithm image file based on the identifier of the second algorithm image file comprises:
determining, by the camera based on the identifier of the second algorithm image file, that the second algorithm image file is stored in a memory of the camera; and
obtaining, by the camera, the at least one second algorithm image file from the memory.

5. The algorithm update method according to claim 1, wherein generating, by the camera, the second algorithm container instance based on the second algorithm image file comprises:
generating, by the camera, a second algorithm container image based on a container engine and the second algorithm description file, wherein the container engine is preset in the camera; and
creating, by the camera, the second algorithm container instance based on the second algorithm container image and the second algorithm image file.

6. The algorithm update method according to claim 1, wherein after the deleting, by the camera, the first algorithm container instance corresponding to the first algorithm container identifier, the method further comprises:
determining, by the camera, a first algorithm container image and a first algorithm image file that corresponds to the first algorithm container identifier, wherein the first algorithm is encapsulated in the first algorithm image file; and
deleting, by the camera, the first algorithm container image and the first algorithm image file.

7. A camera comprising:
an interface configured to communicated with a monitoring system;
one or more processors, configured to:
receive a deletion instruction that comprises a first algorithm container identifier and that is sent by the monitoring system, wherein the first algorithm container identifier in the deletion instruction is an identifier of a first algorithm container instance in the camera, and a first algorithm runs in the first algorithm container instance;
delete the first algorithm container instance corresponding to the first algorithm container identifier;
receive a deployment instruction that comprises a second algorithm description file and that is sent by the monitoring system;
parse the second algorithm description file to obtain an identifier of a second algorithm image file, wherein a second algorithm is encapsulated in the second algorithm image file;
obtain the second algorithm image file based on the identifier of the second algorithm image file; and
generate a second algorithm container instance based on the second algorithm image file, wherein the second algorithm runs in the second algorithm container instance.

8. The camera according to claim 7, wherein the one or more processors are further configured to:
determine based on the identifier of the second algorithm image file, a one second algorithm image file that is not stored in the camera and another second algorithm image file that is stored in the camera;
send a request to the monitoring system to obtain the one second algorithm image file;
receive the one second algorithm image file sent by the monitoring system; and
create the at least one second algorithm image file by using the one second algorithm image file and the other second algorithm image file.

9. The camera according to claim 7, wherein the one or more processors are further configured to:
determine based on the identifier of the second algorithm image file, that the second algorithm image file that is not stored in the camera;
send to the monitoring system, a request for obtaining the second algorithm image file; and
receive the second algorithm image file sent by the monitoring system.

10. The camera according to claim 7, wherein the one or more processors are further configured to:
determine, by the camera based on the identifier of the second algorithm image file, the second algorithm image file that is stored in the camera; and
obtain, by the camera, the second algorithm image file.

11. The camera according to claim 7, wherein the one or more processors are further configured to:
generate a second algorithm container image based on a container engine and the second algorithm description file, wherein the container engine is preset in the camera; and
create the second algorithm container instance based on the second algorithm container image and the second algorithm image file.

12. The camera according to claim 7, wherein the one or more processors are further configured to:
determine, by the camera, a first algorithm container image and a first algorithm image file that corresponds to the first algorithm container identifier, wherein the first algorithm is encapsulated in the first algorithm image file; and
delete, by the camera, the first algorithm container image and the first algorithm image file.

13. A computer program product, when the computer program product runs on a computer or one or more processors, the computer or the one or more processors are configured to:
receive a deletion instruction sent by the monitoring system, the deletion instruction comprising a first algorithm container identifier sent by the monitoring system, wherein the first algorithm container identifier in the deletion instruction is an identifier of a first algorithm container instance in the camera, and a first algorithm runs in the first algorithm container instance;
delete the first algorithm container instance corresponding to the first algorithm container identifier;
receive a deployment instruction sent by the monitoring system, the deployment instruction comprising a second algorithm description file;
parse the second algorithm description file to obtain an identifier of a second algorithm image file, wherein a second algorithm is encapsulated in the second algorithm image file;
obtain the second algorithm image file based on the identifier of the second algorithm image file; and generate a second algorithm container instance based on the second algorithm image file, wherein the second algorithm runs in the second algorithm container instance.

14. The computer program product according to claim 13, wherein the computer or the one or more processors are further configured to:
  determine based on the identifier of the second algorithm image file, one second algorithm image file that is not stored in the camera and another second algorithm image file that is stored in the camera;
  send a request to the monitoring system to obtain the one second algorithm image file;
  receive the one second algorithm image file sent by the monitoring system; and
  create the second algorithm image file by using the one second algorithm image file and the other second algorithm image file.

15. The computer program product according to claim 13, wherein the computer or the one or more processors are further configured to:
  determine, based on the identifier of the second algorithm image file, that the second algorithm image file is not stored in the camera;
  send to the monitoring system a request to obtain the at least one second algorithm image file; and
  receive the second algorithm image file sent by the monitoring system.

16. The computer program product according to claim 13, wherein the computer or the one or more processors are further configured to:
  determine, by the camera based on the identifier of the second algorithm image file, the second algorithm image file that is stored in the camera; and
  obtain, by the camera, the second algorithm image file.

17. The computer program product according to claim 13, wherein the computer or the one or more processors are further configured to:
  generate a second algorithm container image based on a container engine and the second algorithm description file, wherein the container engine is preset in the camera; and
  create the second algorithm container instance based on the second algorithm container image and the second algorithm image file.

18. The computer program product according to claim 13, wherein the computer or the one or more processors are further configured to:
  determine, by the camera, a first algorithm container image and a first algorithm image file that corresponds to the first algorithm container identifier, wherein the first algorithm is encapsulated in the first algorithm image file; and
  delete, by the camera, the first algorithm container image and the first algorithm image file.

\* \* \* \* \*

UNITED STATES PATENT AND TRADEMARK OFFICE
CERTIFICATE OF CORRECTION

PATENT NO. : 11,740,886 B2
APPLICATION NO. : 17/213834
DATED : August 29, 2023
INVENTOR(S) : Jianwen Huang et al.

Page 1 of 1

It is certified that error appears in the above-identified patent and that said Letters Patent is hereby corrected as shown below:

In the Claims

In Column 18, Line 28, in Claim 1, delete "identifier," and insert -- identifier --.

In Column 19, Line 30, in Claim 6, after "after" delete "the".

In Column 22, Line 4, in Claim 16, delete "camera" and insert -- camera, --.

Signed and Sealed this
Twenty-fourth Day of October, 2023

Katherine Kelly Vidal
*Director of the United States Patent and Trademark Office*